Feb. 25, 1930. W. C. ARSEM 1,748,822
METHOD OF MAKING SECTIONAL TWO-COMPONENT WIRE
Filed Oct. 29, 1926
Fig. 1.
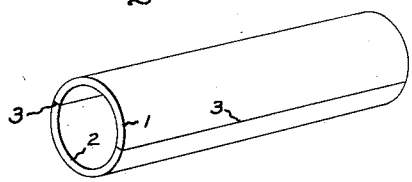
Fig. 2.
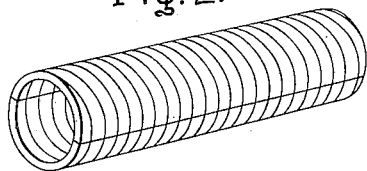
Fig. 3.
Fig. 4.
Fig. 5.
Fig. 6.
Fig. 7.
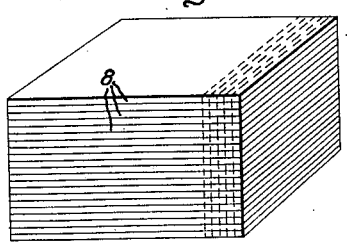
Fig. 8.
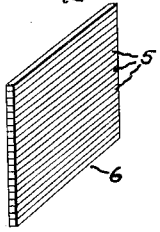
Fig. 9.
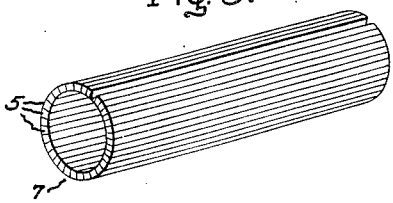
Fig. 10.
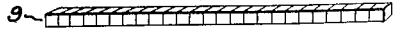
Fig. 11.
Inventor:
William C. Arsem;
by
His Attorney.

Patented Feb. 25, 1930

1,748,822

UNITED STATES PATENT OFFICE

WILLIAM C. ARSEM, OF SCHENECTADY, NEW YORK, ASSIGNOR TO GENERAL ELECTRIC COMPANY, A CORPORATION OF NEW YORK

METHOD OF MAKING SECTIONAL TWO-COMPONENT WIRE

Application filed October 29, 1926. Serial No. 145,094.

The present invention relates to a method for making sectional two-component wire which is suitable for use in the manufacture of thermopiles. In the fabrication of thermopiles, it is usual to provide a large number of separately welded junctions between unlike metals, and it has been one of the problems of thermopile manufacture to provide a continuous length of composite wire of suitable diameter with alternate sections of unlike metals which may be bent to a desired shape to form a thermopile and which may be manufactured at a cost which would not be prohibitive from a commercial standpoint.

According to the present invention a hollow cylinder is constructed of alternate sections of unlike metals extending lengthwise from end to end of the cylinder, and the sections are welded or brazed together in any suitable manner. The cylinder is then cut helically into a continuous length of square wire which is flattened or passed through a series of dies to make the wire circular and increase its length to the required dimensions. The wire may then be bent to any desired form to constitute a thermopile. In this manner a great length of sectional wire or ribbon may be made with only two initial welding operations.

The novel features which I believe to be characteristic of my invention are set forth with particularity in the appended claim. The invention itself, however, will best be understood by reference to the accompanying drawing in which Fig. 1 is a perspective view of a hollow cylinder formed in accordance with my invention; Fig. 2 shows a cylinder cut into a helical strip; while Figs. 3 and 4 show respectively a straightened wire before and after it is passed through a die; Figs. 5 and 6 are detail views showing the manner of joining the edges of the half cylinders; Figs. 7, 8 and 9 illustrate modifications of my invention in which the hollow cylinder, from which the wire is formed, comprises a relatively large number of alternate sections of unlike metals; while Figs. 10 and 11 show respectively the straightened composite wire before and after it is passed through a die.

Referring to the drawing, I have indicated in Fig. 1 a hollow cylinder comprising a pair of half cylinders 1 and 2 consisting of unlike metals, such as chrome-nickel and Monel metal. The two half cylinders may be welded together by placing a thin strip 3 of copper or other metal, which fuses below the melting point of the parts to be welded, between the parts to be welded and heating the assembled joint in a non-oxidizing atmosphere. If desired the edges of the surfaces to be joined may be machined so that they meet in an edge 1 only leaving a slot 4 of V-shaped cross-section. Welding can be effected by melting into the V-shaped slot, electrically or by gas burner, a metal having a melting point lower than that of the metals to be joined, or, if desired, the welding may be accomplished by the use of an atomic hydrogen torch, thus avoiding the use of a low melting metal.

After the half cylinders are welded together the cylinder is cut helically, as indicated in Fig. 2, into a continuous length of square wire which is then straightened, as shown in Fig. 3, and passed through a die or a series of dies to make it any diameter and length required. If desired, however, the square wire may be formed into a flat thin wire instead of a round wire. The wire may be bent into any desired shape to form a thermopile.

Instead of making a cylinder of two sections only, it may be made up of a great many sections. Such a cylinder may be produced, for example, by welding together edge to edge a series of strips 5 (see Fig. 8) to form a flat plate 6 and then completing the cylinder by welding together the outside edges of the sheet to form a cylinder 7. The cylinder 7 then can be cut helically, as indicated in Fig. 2, after which the square wire or ribbon thus obtained can be drawn to the required size or flattened as desired. An alternative way to obtain a sheet of metal composed of alternate strips would be to fuse or weld together under heat and pressure a series of superimposed sheets 8, as indicated in Fig. 7. These sheets then can be cut at right angles to the planes of the sheets to provide a series of sheets made up of alternate strips of metal, as indicated in Fig. 8. The sectional sheets then can be formed into a cylinder after which the cylinder can be cut helically to form a flat wire 9 (see Fig. 10) which can be drawn to any convenient size, as indicated in Fig. 11, or flattened by swaging or rolling to provide a relatively thin, wide wire.

The metals employed in making the sectional wire may be any suitable combination, for example, the alternate sections need be simply two metals which have the requisite ductility and a reasonable potential difference per degree difference of temperature.

What I claim as new and desire to secure by Letters Patent of the United States, is:—

The process of making a composite wire or ribbon which comprises superimposing alternate sheets of unlike metals, fusing said sheets together, cutting the sheets transverse to the planes thereof to provide a series of welded alternate strips of unlike metals forming said series of strips into a cylinder in which said strips extend lengthwise from end to end of the cylinder and cutting the cylinder helically into a continuous length of wire.

In witness whereof, I have hereunto set my hand this 28th day of October, 1926.

WILLIAM C. ARSEM.